Dec. 31, 1929. O. A. PEARSON 1,741,711
COIL CUTTING MACHINE
Filed July 30, 1928 4 Sheets-Sheet 4
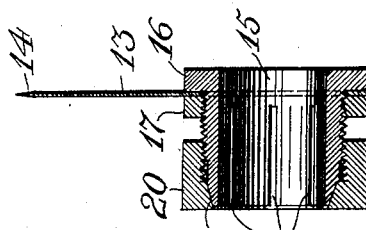
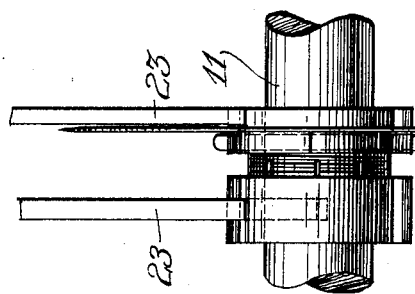
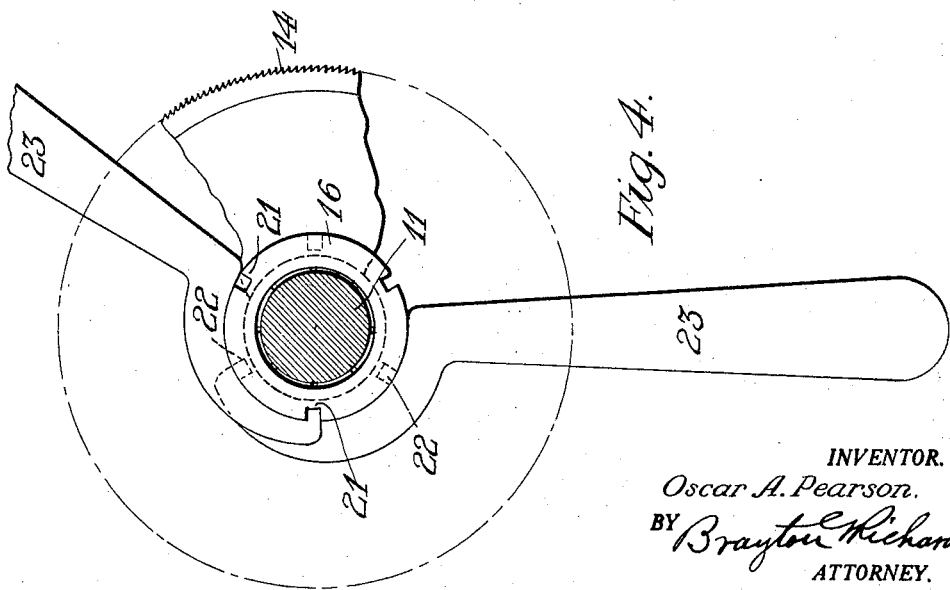
INVENTOR.
Oscar A. Pearson.
BY Brayton Richards
ATTORNEY.

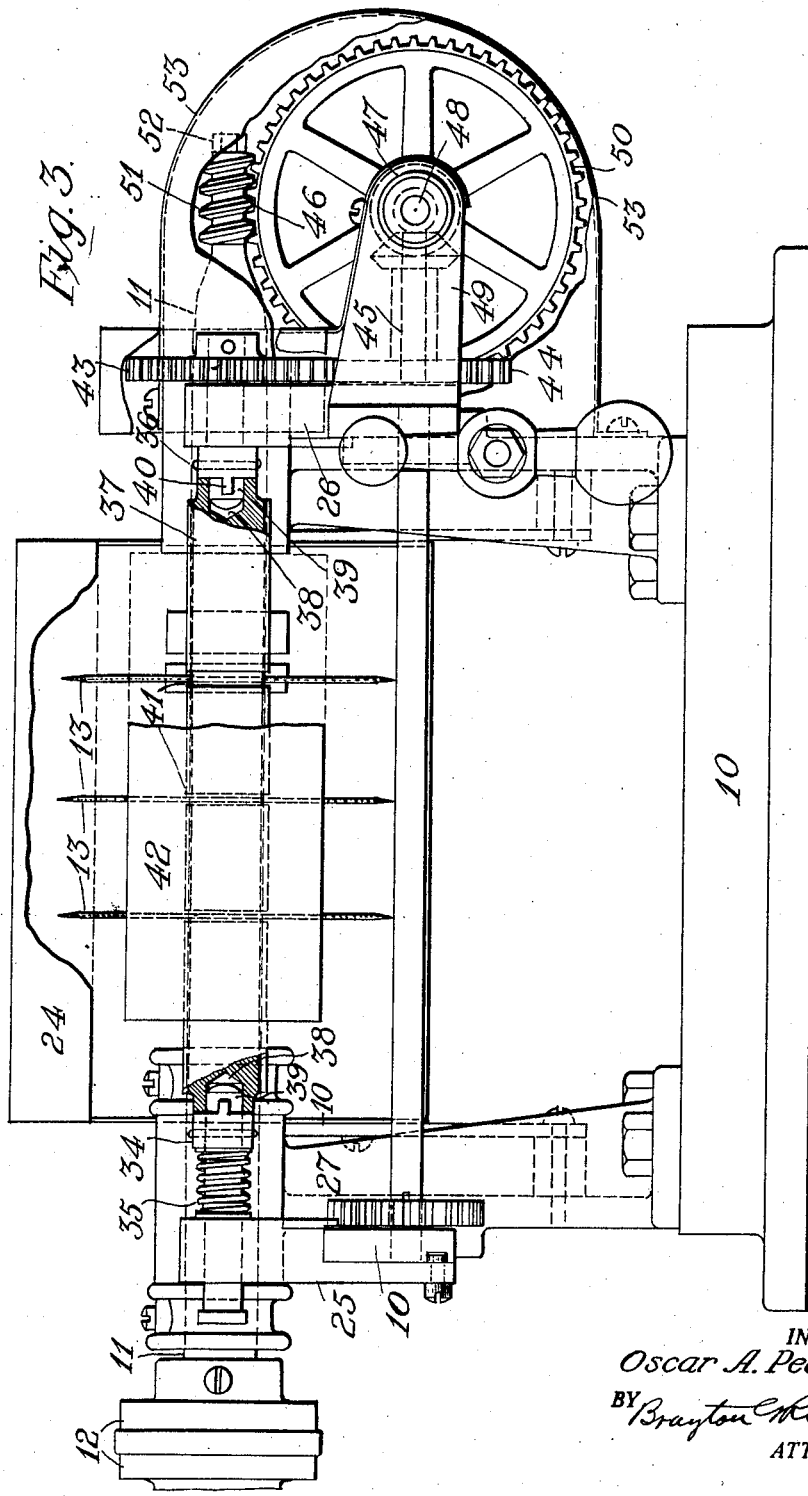

Patented Dec. 31, 1929

1,741,711

UNITED STATES PATENT OFFICE

OSCAR A. PEARSON, OF OAK PARK, ILLINOIS, ASSIGNOR TO THORDARSON ELECTRIC MANUFACTURING COMPANY, OF CHICAGO, ILLINOIS, A CORPORATION OF ILLINOIS

COIL-CUTTING MACHINE

Application filed July 30, 1928. Serial No. 296,254.

The invention relates to improvements in coil cutting machines and has for its primary objects the provision of an improved machine for severing electric coils or the like from each other.

Another object of the invention is the provision of a machine of the character indicated provided with improved means for adjusting the same to the cutting of coils or the like of different sizes.

Another object of the invention is the provision of a machine of the character indicated provided with the improved means for mounting work therein or removing the work therefrom.

Other objects will appear hereinafter.

The invention consists in the combinations and arrangements of parts hereinafter described and claimed.

The invention will be best understood by reference to the accompanying drawings forming a part of this specification and in which—

Figure 1:
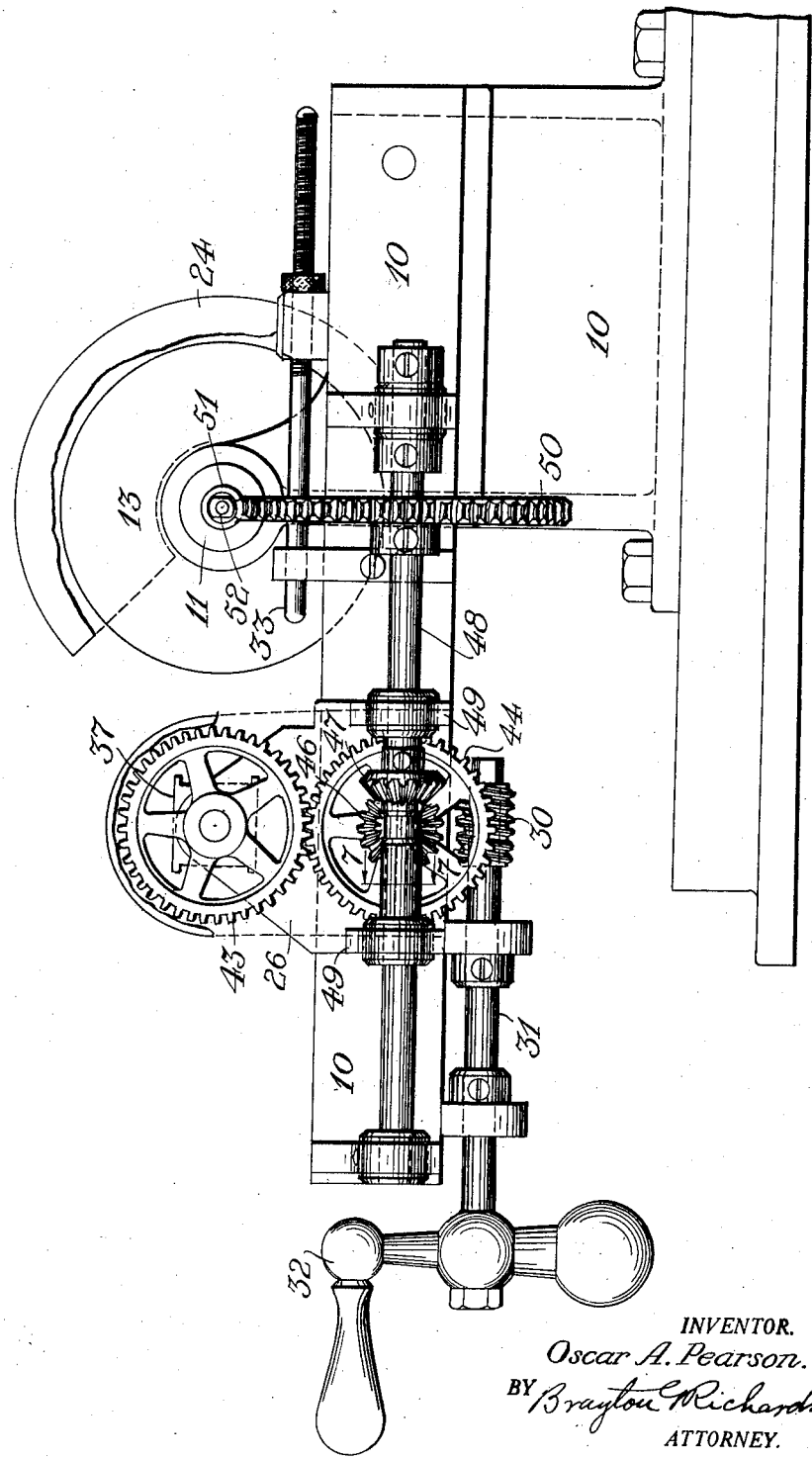
Figure 2:
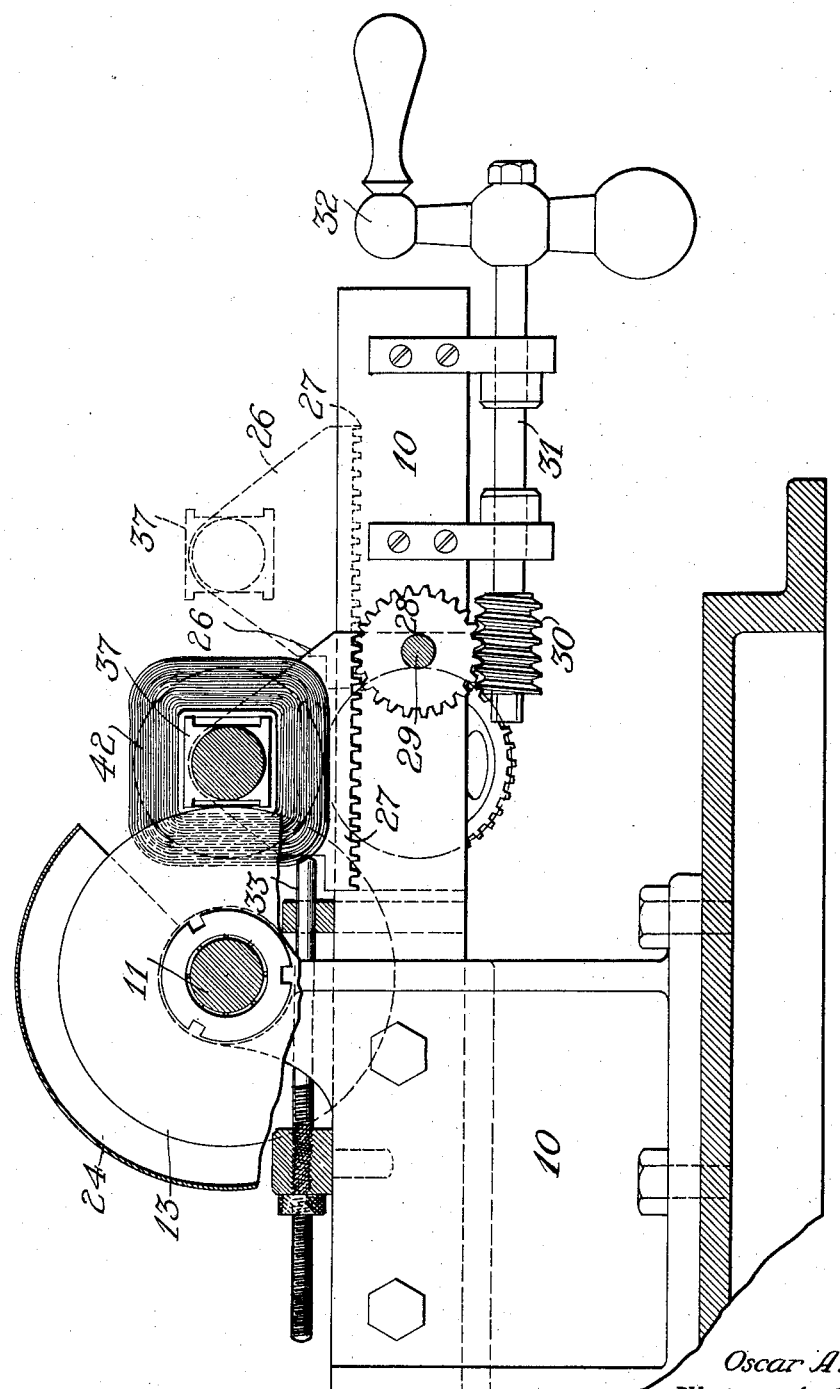

Fig. 1 is an end view of a machine embodying the invention;

Fig. 2, a transverse vertical section of said machine;

Fig. 3, a front view of the machine with portions broken away and other portions shown in section for the sake of clearness;

Fig. 4, a view illustrating means for adjusting cutting members employed in the machine;

Fig. 5, a view at right angles to Fig. 4;

Fig. 6, a section of one of the cutting members, and

Fig. 7, an enlarged section taken substantially on line 7—7 of Fig. 1.

The preferred form of construction as illustrated in the drawings comprises a suitable frame 10 having a drive shaft 11 mounted in suitable bearings thereon as shown. The drive shaft 11 is extended at one end and is there equipped with a coupling 12 by means of which the same is connected with an electric motor, not shown, for constantly driving said driving shaft.

Arranged on the shaft 11 is a plurality of cutting members 13 each in the form of a circular saw blade having relatively fine saw teeth 14 in its periphery. Each of the cutting members 13 is carried by a hub 15 having a flange 16 at one end and a binding nut 17 threaded on its periphery as best shown in Fig. 6, and serving to secure the cutting member to the hub.

The hub 15 is provided with a plurality of longitudinal slits 18 and a beveled nose 19 co-operating with a clamping nut 20 threaded on said hub as shown, whereby the cutting member may be securely clamped on the shaft 11 or released and readily adjusted on said shaft.

To facilitate such release and adjustments of the cutting members 13 on the shaft 11, each of the flanges 16 is provided with notches 21 and each nut 20 is provided with notches 22 for engagement by spanner wrenches 23, as indicated in Figs. 4 and 5, whereby the hubs 15 may be readily adjusted on shaft 11 as will be readily understood. Obviously, the shaft 11 may be made as long or as short as desired and as many of the cutting members 13 applied thereto as may be desired, and said cutting members may be readily adjusted to provide different spaces between them and therefore render the machine capable of cutting coils or the like into various lengths.

A suitable hood 24 is arranged on the frame 10 over the cutting members 13 to guard the same to prevent injury to the operator.

Arranged on the frame 10, upon suitable guides, are two supporting saddles or carriage members 25 and 26 slidably mounted to reciprocate toward and away from the shaft 11 in a direction substantially perpendicular to said shaft. Each of said saddle members is provided on its inner side with a rack bar 27 meshing with a corresponding pinion 28 on a shaft 29 mounted in the frame 10, as shown.

One of the pinions 28 meshes with a worm 30 on a hand shaft 31 operable by a hand crank 32, as indicated, whereby the saddle members 25 and 26 may be readily adjusted toward and away from the shaft 11. An adjustable stop bar 33 is also provided on the frame 10 to limit the approach of said saddle members to said shaft.

A spindle 34 is mounted as shown in the saddle member 25 and arranged to have longitudinal movement in its bearing, being yieldingly held in normal position of operation by means of a compression spring 35. A co-operating spindle 36 is mounted in the saddle member 26 in axial alignment with the spindle 34 and in co-operative relationship with the cutting members 13 on the shaft 11. A rectangular work bar 37 is detachably mounted between the spindles 34 and 36, said work bar being provided, as shown, with reduced ends having sockets 38 adapted to fit over projections 39 on said spindles, said reduced ends being also provided with notches engaging locking lugs 40 on the spindles to prevent rotation of the bar 37 relatively to the spindles.

The work bar 37 is provided with grooves 41 registering with the cutting members 13. The coils 42 or other work to be cut upon the machine are mounted on the bars 37 for the purpose. The form of coil construction illustrated consists of a tubular member 42 composed chiefly of insulating paper and having a number of coils wound thereon.

The tubular member 42 is fitted on a suitable bar 37 having the grooves 41 provided therein at the places where it is desired to sever said tubular member into sections in order to separate the coils thereon, the cutting members 13 being correspondingly adjusted to register with the grooves 41. Thus, when the work is presented to the cutting members 13, the cutting edges of the members 13 will pass into the grooves 41, thereby completely severing the work and avoiding contact with the bar 17. The stop 23 is adjusted so as to cause the cutting edges of the cutting members 13 to enter the grooves 41 but preventing contact with the bottoms of said grooves.

The spindle 36 carries a gear 43 meshing with another gear 44 on a shaft 45 mounted on the lower portion of the saddle 26, as indicated. The shaft 45 carries a beveled gear 46 meshing with a beveled gear 47 splined on a countershaft 48 mounted on the frame 10, as shown. The gear 47 is positioned between two parallel projecting arms 49 on the saddle 26 so that said gear wil be carried along the shaft 48 with the saddle member 26 but, being splined to the shaft 48, must turn therewith. Obviously, by this arrangement, the spindle 36 and the work bar 37 will be constantly rotated by the shaft 48 as the work on the work bar 37 is applied to the cutting members 13. The countershaft 48 is driven by means of a worm wheel 50 meshing with a worm 51 on a reduced and extended end 52 of the drive shaft 11. A suitable housing 53 is arranged over the said gearing to protect the operator from injury therein.

By this arrangement a simple and effective machine is provided for cutting or severing coils or the like.

It will be noted that the work may be quickly inserted in or removed from the machine and radially cut into desired lengths. The cutting members 13 may be readily adjusted to cutting work of different sizes and more or less of said cutting members may be employed depending upon the number of sections into which it is desired to cut the work. The specific form and arrangements of parts is a simple and effective one for the purpose.

While I have illustrated and described the preferred form of construction for carrying my invention into effect, this is capable of variation and modification without departing from the spirit of the invention. I, therefore, do not wish to be limited to the precise details set forth but desire to avail myself of such variations and modifications as fall within the scope of the appended claims.

I claim:

1. A machine of the class described comprising a frame; a shaft in said frame; means for driving said shaft; a plurality of cutting members on said shaft; a carriage mounted on said frame to reciprocate toward and away from said shaft; a pair of axially alined cooperating spindles on said carriage; a work carrying bar detachably mounted between said spindles to carry work to said cutting members; means for driving one of said spindles from said shaft; and means for reciprocating said carriage.

2. A machine of the class described comprising a frame; a shaft in said frame; means for driving said shaft; a plurality of cutting members on said shaft; a carriage mounted on said frame to reciprocate toward and away from said shaft; a pair of axially aligned cooperating spindles on said carriage; a work carrying bar detachably mounted between said spindles to carry work to said cutting members; means for driving one of said spindles; a pair of rack bars on said carriage substantially perpendicular to the axis of said shaft; a shaft on said frame carrying pinions meshing with and operating said rack bars; and a hand shaft on said frame carrying a worm meshing with one of said pinions.

3. A machine of the class described comprising a frame; a shaft in said frame; means for driving said shaft; a plurality of cutting members on said shaft; a carriage mounted on said frame to reciprocate toward and away from said shaft; a pair of axially aligned cooperating spindles on said carriage; a work carrying bar detachably mounted between said spindles to carry work to said cutting members; means for driving one of said spindles from said shaft; a pair of rack bars on said carriage substantially perpendicular to the axis of said shaft; a shaft on said frame carrying pinions meshing with and operating said rack bars; and a hand shaft on said frame carrying a worm meshing with one of said pinions.

4. A machine of the class described comprising a frame; a shaft in said frame; means for driving said shaft; one or more cutting members on said shaft; a carriage mounted on said frame to reciprocate toward and away from said shaft; means on said carriage for rotatably mounting an article to be cut by said cutting members; means operable by said shaft for rotating said article mounting means; and means for reciprocating said carriage.

5. A machine of the class described comprising a frame; a shaft in said frame; means for driving said shaft; one or more cutting members on said shaft; a carriage mounted on said frame to reciprocate toward and away from said shaft; a pair of axially aligned spindles on said carriage; a work carrying bar mounted between said spindles to carry work to said cutting members; a pair of rack bars on said carriage substantially perpendicular to the axis of said shaft; a shaft on said frame carrying pinions meshing with and operating said rack bars; a hand shaft on said frame carrying a worm meshing with one of said pinions; a counter-shaft driven from said first mentioned shaft and arranged substantially parallel to said rack bars; a gear on one of said spindles; and a gearing having a driving connection with said last mentioned gear and a splined connection with said counter-shaft.

In witness that I claim the foregoing as my invention, I affix my signature this 27th day of July, A. D. 1928.

OSCAR A. PEARSON.